(12) United States Patent
Youngwerth et al.

(10) Patent No.: US 10,180,165 B2
(45) Date of Patent: Jan. 15, 2019

(54) WEAR LINER AND IMPROVED FRICTION DISKS FOR USE IN A STANDARD CLUTCH BASKET

(76) Inventors: Albert J. Youngwerth, Boise, ID (US); Sean G. Brown, Boise, ID (US); Danny S. Youngwerth, Boise, ID (US)

( * ) Notice: Subject to any disclaimer, the term of this patent is extended or adjusted under 35 U.S.C. 154(b) by 993 days.

(21) Appl. No.: 13/338,535

(22) Filed: Dec. 28, 2011

(65) Prior Publication Data

US 2013/0168198 A1    Jul. 4, 2013

(51) Int. Cl.
*F16D 13/68*     (2006.01)

(52) U.S. Cl.
CPC .................. *F16D 13/683* (2013.01)

(58) Field of Classification Search
CPC ................... F16D 13/683; F16D 13/68; F16D 2065/1312; F16D 2065/1324
USPC ....................... 192/70.19, 70.2, 119
See application file for complete search history.

(56) References Cited

U.S. PATENT DOCUMENTS

| | | | |
|---|---|---|---|
| 3,191,735 A * | 6/1965 | Wavak | 192/110 R |
| 3,438,464 A * | 4/1969 | Barrington | F16D 55/36 |
| | | | 188/205 A |
| 4,574,449 A * | 3/1986 | Wussow | 29/402.06 |
| 6,272,725 B1 * | 8/2001 | Stout, Jr. | 29/402.06 |
| 6,637,574 B2 * | 10/2003 | Landa et al. | 192/70.2 |
| 6,708,807 B1 | 3/2004 | Martin | |
| 7,287,632 B1 | 10/2007 | Taylor | |

\* cited by examiner

*Primary Examiner* — David J Hlavka
(74) *Attorney, Agent, or Firm* — Scott D. Swanson; Shaver & Swanson, LLP (57) ABSTRACT

An improved liner and friction disk for a clutch basket is disclosed. The improved liner is easily retrofitted into a typical clutch basket and is held in place without fasteners or adhesives or special changes to the clutch basket. The improved liner is held in place without consideration to the outer diameter of the basket allowing the liner to work with a wider range of clutch basket designs and sizes. The liner provides an improved wear surface for the clutch basket's engagement surface with the driving friction surface. A friction disk with tabs adapted to fit inside the narrowed space provided by the improved liner is also disclosed.

4 Claims, 6 Drawing Sheets

WEAR LINER AND IMPROVED FRICTION DISKS FOR USE IN A STANDARD CLUTCH BASKET

BACKGROUND OF THE INVENTION

This invention relates to a clutch system of the friction type placed in a power transmission system. Typical clutch systems include a clutch input such as a clutch basket, a clutch output such as a center clutch, and one or more plates making up a clutch pack and disposed between the clutch input and clutch output. When the clutch pack is compressed, the clutch input and clutch output become rotationally coupled. The clutch pack is typically compressed by a pressure plate; the pressure plate typically providing a compressive force via a spring mechanism or through a centrifugally actuated mechanism. Most clutch systems can be disengaged by means of a lever acting on a clutch throwout which pushes the pressure plate away from clutch pack, rotationally decoupling the clutch input and clutch output.

Most motorcycles incorporate a clutch system whose clutch pack includes multiple driving friction plates and driven plates. The driving friction plates are typically formed from aluminum with friction material bonded to both sides of the plate. The driving friction plates are typically coupled rotationally with the clutch basket. Driven plates are typically formed from steel and are typically coupled rotationally with the center clutch.

Most motorcycles incorporate a clutch basket that is formed from aluminum. Aluminum is inexpensive to cast and lightweight relative to other materials such as steel. However, one disadvantage of aluminum for constructing a clutch basket is that it is soft relative to other materials such as steel. Significant wear at the surfaces on the clutch basket where the driving friction disks engage the clutch basket is a common problem.

One problem with forming the driving friction plates from aluminum is heat storage and heat expansion. When the clutch slips, during take-off for example, heat is generated. The driving friction plates and driven plates absorb this heat until the heat can dissipate out of the clutch system. If the clutch slips excessively, the heat build-up can be significant; causing the clutch pack to expand. When the clutch pack expands from heat, the pressure plate is pushed away from the clutch throwout; requiring more lever movement to rotationally decouple the clutch input and clutch output. This phenomenon is known as "clutch fade".

It is well known that steel, by volume, has more thermal capacity and a lower thermal coefficient of expansion than aluminum. By forming the friction plate from steel instead of aluminum, given the same amount of slip and therefore the same amount of heat generation, a clutch system incorporating driving friction disks formed from steel will have reduced "clutch fade" vs. a clutch system incorporating driving friction disks formed from aluminum.

However, steel is typically much harder than aluminum. When a driving friction disk formed from steel is used in place of a driving friction disk formed from aluminum, wear at the surfaces on the aluminum clutch basket where the driving friction disks engage the clutch basket is accelerated.

The KTM 2006 450 SXF motorcycle model uses driving friction plates formed from steel and a clutch basket formed from steel. The KTM motorcycles are considered a premium brand and are generally more expensive than similar motorcycles from other manufactures. Most modern motorcycles use driving friction plates and a clutch basket formed from aluminum.

One way to overcome the problem of excessive wear of the clutch basket from the driving friction plates is to form the clutch basket from a harder, more wear resistant material such as steel. However, forming a clutch basket from steel would increase its weight and likely its cost versus a clutch basket formed from aluminum. A lightweight clutch basket is advantageous in that it has less reciprocating mass; allowing for quicker acceleration than a heavier clutch basket.

Typically the driving friction plates wear out and are replaced several times before the clutch basket is replaced due to wear. Requiring the owner of a vehicle to purchase a new clutch basket to prevent rapid wear from the use of improved driving frictions plates formed from steel is undesirable for both cost and increased weight of the clutch basket.

Steel is also stronger than aluminum. Forming the driving friction plate from steel allows the use of a driving friction plate that is thinner than a comparable aluminum driving friction disk and having the same strength. It is well known that by using more driving friction plates in a clutch system that the clutch system will have greater torque capacity assuming equal spring pressure. However, a thinner driving friction plate will have even greater wear characteristics against a relatively soft clutch basket due to the reduced surface area at the point of engagement with the clutch basket.

Taylor in U.S. Pat. No. 7,287,632 and Martin in U.S. Pat. No. 6,708,807 have proposed using liners, formed from a hard material such as steel, between the clutch basket and the driving friction plates to reduce wear and provide a replaceable wear surface. Both U.S. Pat. Nos. 7,287,632 and 6,708,807 are included herein by reference. Such a liner could be very advantageous in use, especially when combined with driving friction plates formed from steel. However neither Taylor nor Martin have proposed a liner that could easily be adapted by the owner of the vehicle to most common existing clutch baskets. Martin proposes a liner that slides into place without fasteners or adhesives but requires a clutch basket that was designed to accept the liner. Most common existing clutch baskets were not designed to accept a liner such as proposed by Martin. The liner disclosed by Martin requires a clutch basket with substantially recessed planar inner edges and recessed planar outer edges including a well-defined distance between the edges to capture U-shaped retaining clips on each leg. Most modern motorcycle clutch baskets are formed with an inner diameter and an outer diameter. Furthermore, the distance between the inner and outer diameter of the clutch basket varies greatly between clutch basket models. A liner solution that requires retention on the outer and inner diameter will not work on a wide variety of clutch baskets.

Taylor proposes a liner that could be adapted to most common existing clutch baskets but requires some form of adhesive or fastener to hold the liner in place. Securing the liners proposed by Taylor with an adhesive or a fastener is not something that most vehicle owners will be easily capable of doing. Typically, this operation would need to be performed by a specialized repair or remanufacturing facility or be manufactured as part of the original clutch basket. Furthermore, at least some of the liners disclosed by Taylor adapt to and engage both the inner and outer diameter of the clutch basket. Typically many different vehicles from many different manufactures will use a friction disk of the same dimensions. This requires the interior features of the clutch basket to be very similar between many different manufacturers. However, the exterior features of the basket tend to be different between different manufactures because the driving friction disks do not locate on the exterior features. Furthermore, there is often very limited space between the outer diameter of the clutch basket and the engine case; in many cases, a liner covering the outer diameter of the clutch basket could interfere with the engine case.

Therefore, a need exists for an improved liner for a vehicle's existing clutch basket that can easily be installed by the vehicle owner, without special tools or adhesives. A need exists for the liner to be restrained from radial outward movement by the inner diameter of the clutch basket so as to work with the stock clutch basket supplied with most modern motorcycles. The improved liner should provide improved wear resistance to the clutch basket driving friction plate engagement surfaces; especially when used in conjunction with a driving friction plate formed from steel or other material that has increased wear properties against the vehicle clutch basket. Furthermore, a need exists for a clutch pack system with improved resistance to heat induced "clutch fade", that will easily retrofit into a vehicle's existing clutch system without imposing increased wear on the clutch basket's driving friction plate engagement surfaces. The improved clutch pack's friction disk should incorporate a clutch basket engagement tab with reduced width versus the standard friction disk so as to fit in the narrowed space provided by the improved liner.

Heretofore, no one has proposed a liner system than can easily be adaptable by a typical vehicle owner to an existing typical vehicle standard clutch basket, without fasteners or adhesives. Furthermore, no one has proposed a friction disk system whose driving friction plates are formed from a material that offers improved thermal heat capacity vs. the original driving friction plates and that can be retrofitted into an existing clutch basket that is formed from a material softer than the improved friction disk material, without creating accelerated wear on the clutch basket's driving friction plate engagement surfaces and that includes a clutch basket engagement tab with a reduced width to fit within the narrowed slot space provided by the improved liner.

Therefore, it is one object of the invention to provide a friction disk system with improved thermal properties and less thickness than a standard aluminum friction disk that can operate within a standard clutch basket without accelerating the wear of the standard clutch basket in operation. It is another object of the invention to provide a liner system that can easily be retrofitted to a clutch basket that was not designed to use a liner system, without the need for special tools or fasteners. It is another object of the invention to provide the improved liner system in conjunction with a friction disk system with improved thermal properties and less thickness and formed with clutch basket engagement tabs whose width is selected to fit inside the narrowed space provided by the improved liner system.

A preferred embodiment of the present invention is shown in FIGS. 1 through 5.

DETAILED DESCRIPTION OF THE INVENTION

Reference throughout this specification to "an embodiment," or similar language means that a particular feature, structure, or characteristic described in connection with the embodiment is included in at least one embodiment of the present invention. Thus, appearances of the phrases "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of the embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention provides for a novel wear resistant liner for a clutch basket. The improved liner is particularly useful when used with driving friction plates formed from a material harder than the clutch basket to reduce wear on the clutch basket.

Figure 1:
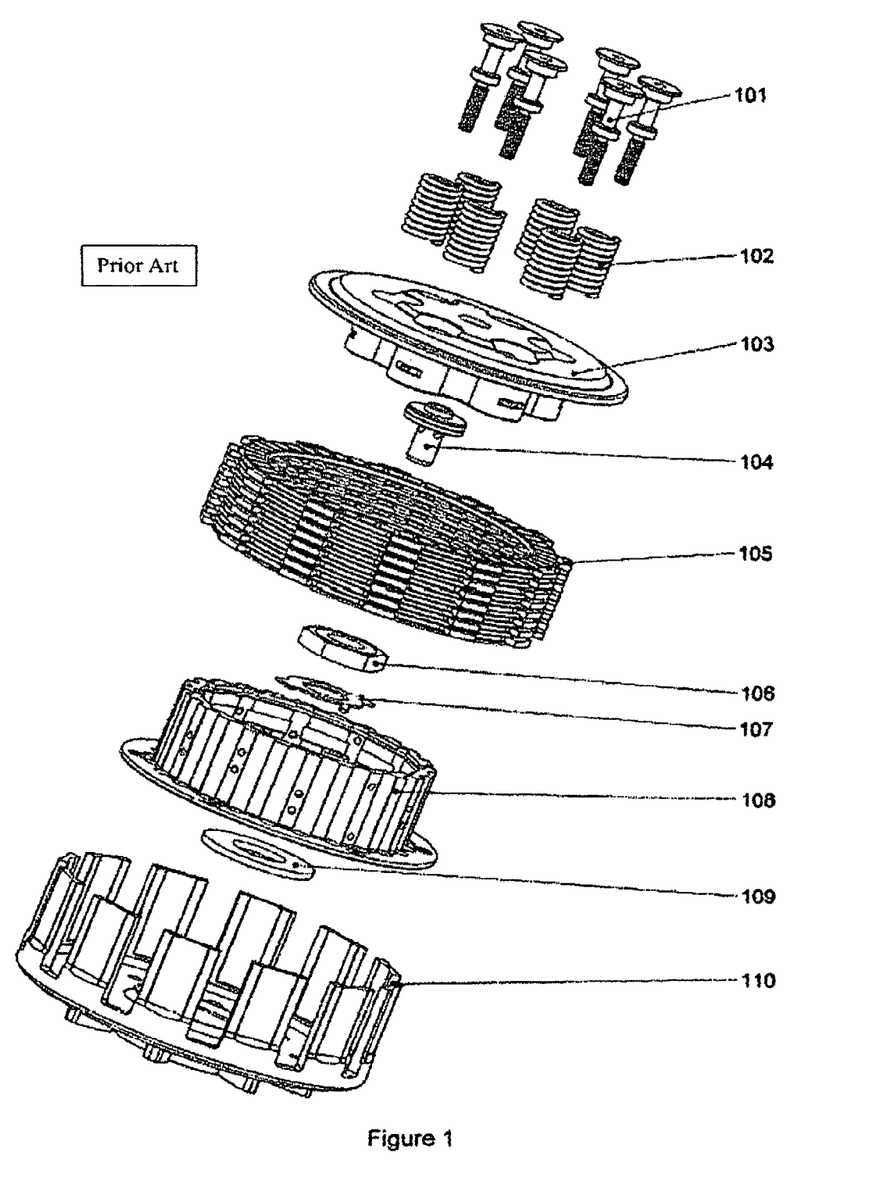
FIG. 1 is an exploded view of a prior art typical clutch system.

FIG. 1 shows the major components of a typical prior art multi-plate clutch system as used in a modern motorcycle. The clutch system of FIG. 1 is also representative of multi-plate clutch systems used in other types of vehicles and machinery.

Referring again to FIG. 1, the clutch basket 110 is typically rotationally connected to a power source (not shown). A center clutch 108 is typically rotationally coupled to an output such as a transmission shaft (not shown). The center clutch nut 106 and washer 107 secure the center clutch to the transmission shaft. The thrust washer 109 allows the clutch basket 110 to spin independently of the center clutch 108. A clutch pack 105 includes driving friction plates interleaved with driven plates. The driving friction plates are coupled rotationally to the clutch basket 110 and driven plates rotationally coupled to the center clutch 108 such that when no pressure is applied to the clutch pack 105, the driving friction plates are able to turn relative to the driven plates and when pressure is applied to the clutch pack 105, a rotational torque can be transmitted from the clutch basket 110 to the center clutch 108. Pressure plate bolts 101 secure a pressure plate 103 to the center clutch 108 through pressure plate springs 102 such that the pressure plate spring 102 force is transmitted to the clutch pack 105. A throwout 104 is provided, typically coupled to a lever through an actuator rod (not shown) to lift the pressure plate 103 away from the clutch pack 105, releasing the spring force against the clutch pack 105.

Figure 2:
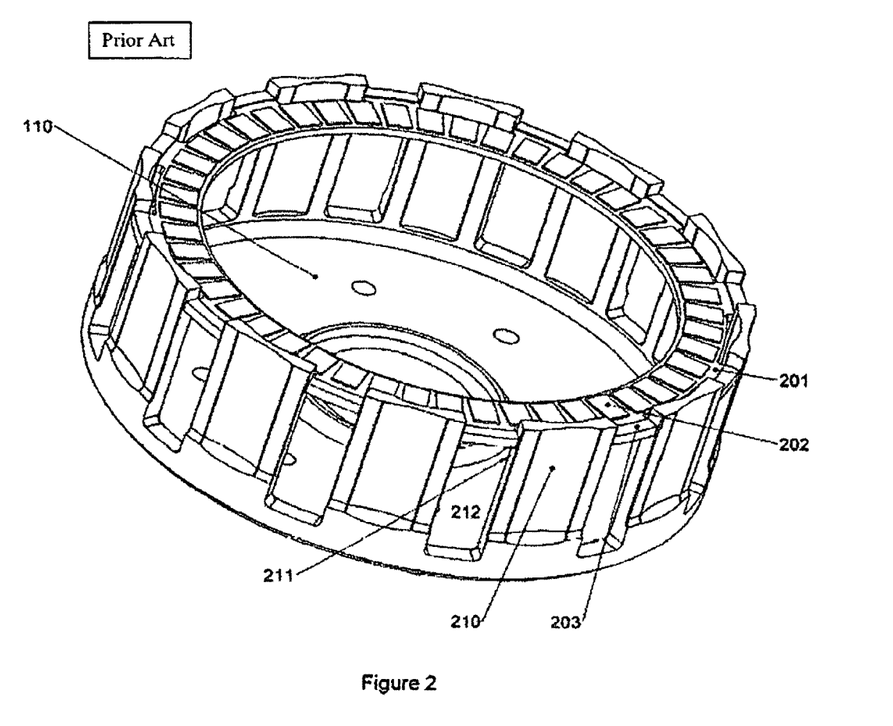
FIG. 2 is a view of a single prior art typical driving friction disk in engagement with a typical clutch basket.

FIG. 2 shows the prior art clutch basket 110 in engagement with a single prior art driving friction plate 201. The driving friction plate 201 includes a plurality of driving friction plate tabs 203 and a plurality of friction pads 202. The clutch basket 110 includes a plurality of fingers 210. Between each finger 210 is a slot 212 to engage a driving friction plate tab 203. The edge of each finger 210 has a clutch basket driving engagement surface 211 to engage and rotationally couple the driving friction plate 201. The clutch basket is subject to wear from the driving forces applied to the driving friction plate tab 203. The rate of wear will generally be increased when the driving friction plate tab 203 is made from a material harder than the clutch basket.

Figure 3A:
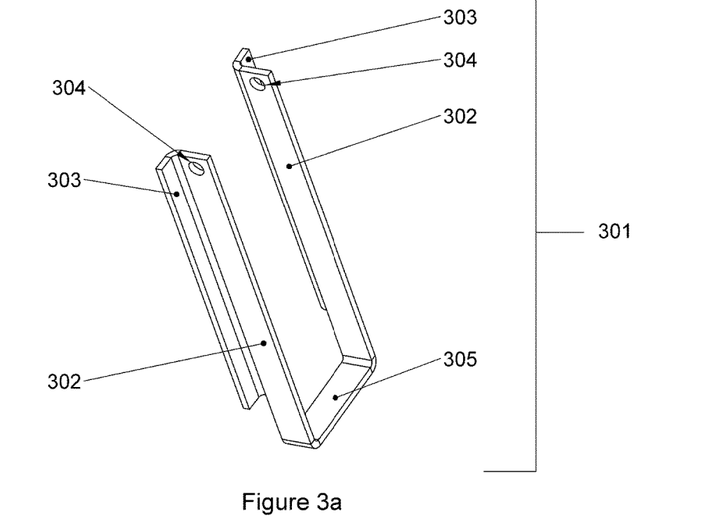
FIGS. 3a and 3b show views of the improved liner.
Figure 3B:
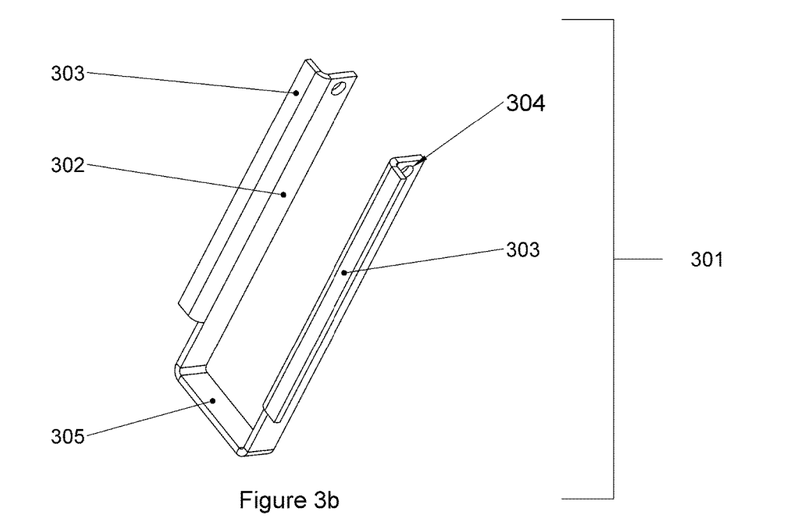

FIGS. 3a and 3b show one embodiment of the improved clutch basket liner 301. The clutch basket liner is generally U-shaped, with two legs 302 connected by a base 305. The legs 302 are at an angle of approximately 90 degrees to the liner base. In another embodiment, the legs 302 are at angle greater than 90 degrees to the liner base. In this embodiment, the increased angle will require the legs to apply an outward spring force against the clutch basket, helping to hold the liner 301 in place during installation.

Extending from each leg 302 at a slightly obtuse angle is an ID capture flange 303. At an end of each driving friction plate leg 302 is an optional hole 304. The hole 304, when used with a suitable tool, can be used to lift the liner and entire clutch pack out of the clutch assembly. The liner base 305 captures the nearest driving friction plate tab 203 and lifts the entire clutch pack 105 with the liner 301, out of the clutch basket 110.

Figure 4:
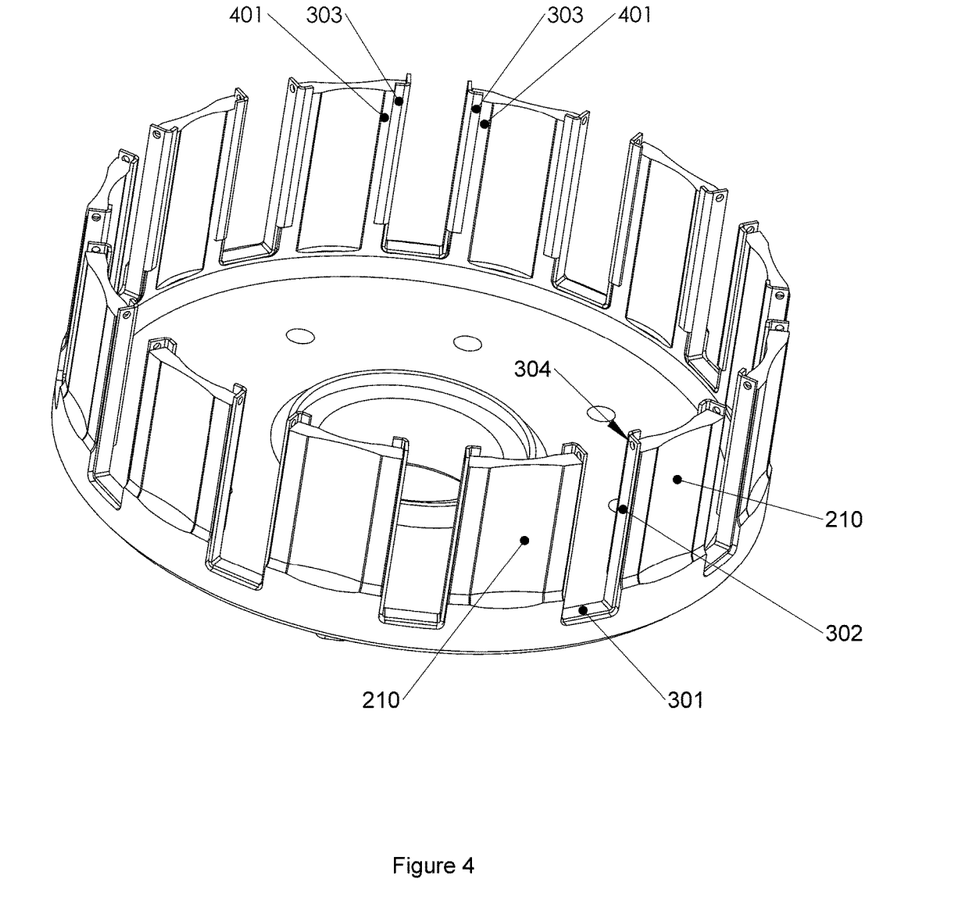
FIG. 4 is a view of the improved liner installed into a typical prior art clutch basket.

FIG. 4 depicts the improved clutch basket liner 301 installed between adjacent fingers 210 of the prior art clutch basket 110. The two legs 302 cover the surface of the clutch basket driving engagement surface 211 (not visible in FIG. 4). The clutch basket liner 301 is restrained from radial outward movement by the ID capture flange 303 engaging the inner surface 401 of the clutch basket. The obtuse angle allows the ID capture flange 303 to conform closely to the inner diameter of the basket and provides clearance to the friction disk outer diatmer. The optimal angle between the ID capture flange 303 and the legs 302 is determined by the inner diameter of the basket: a smaller basket inner diameter requires a larger angle and a larger basket inner diameter requires a smaller angle. In one embodiment, the optimal angle between the ID capture flange 303 and the legs 302 is 95 degrees. The capture flange 303 prevents the clutch basket liner 301 from being flung radially out of the basket due to centrifugal force when the clutch basket 110 rotates.

Figure 5:
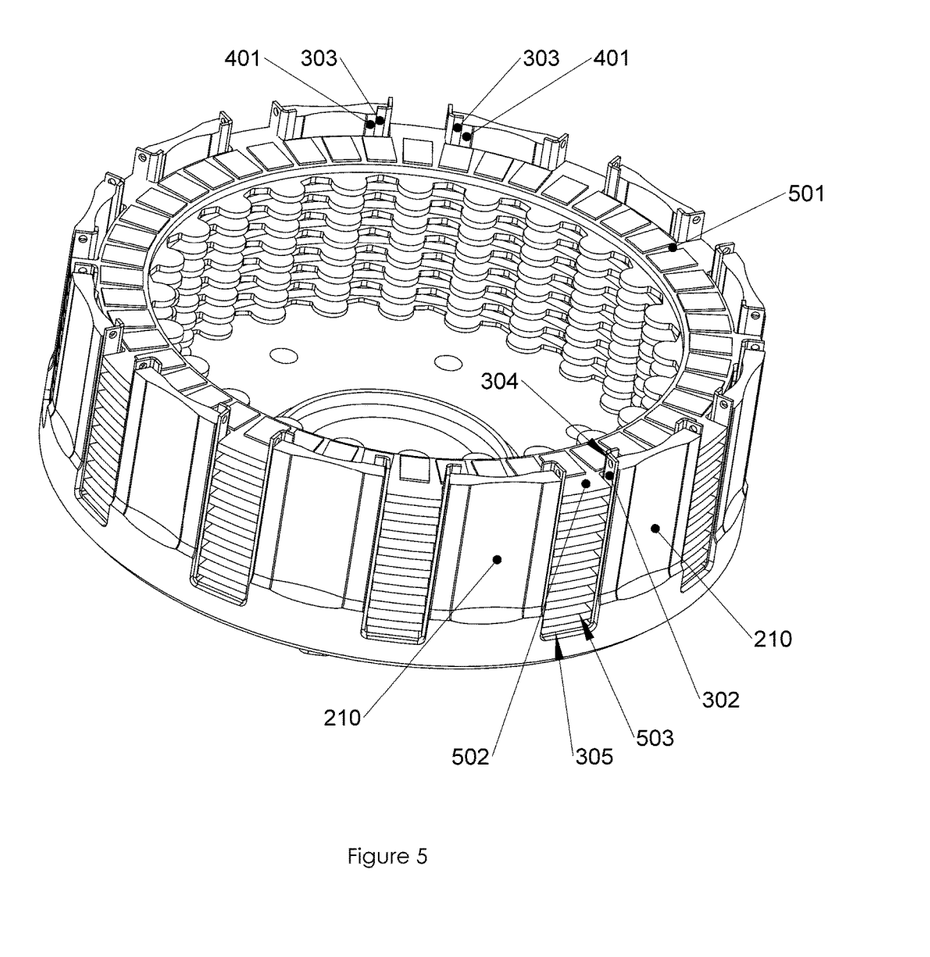
FIG. 5 is a view of the improved liner installed into a typical prior art clutch basket and in engagement with the improved driving friction disk.

FIG. 5 depicts the improved clutch basket liner 301 installed into the prior art clutch basket 110 with a clutch pack 105 having driving friction disks 501 formed with narrowed driving friction plate tabs 502 to fit within the narrowed slot provided by the clutch basket liner 301. In this view, it can be seen that the clutch basket liner 301 is retained from axial movement out of the clutch basket 110 by the friction plate tabs 503 directly adjacent to the liner base 305.

Figure 6:
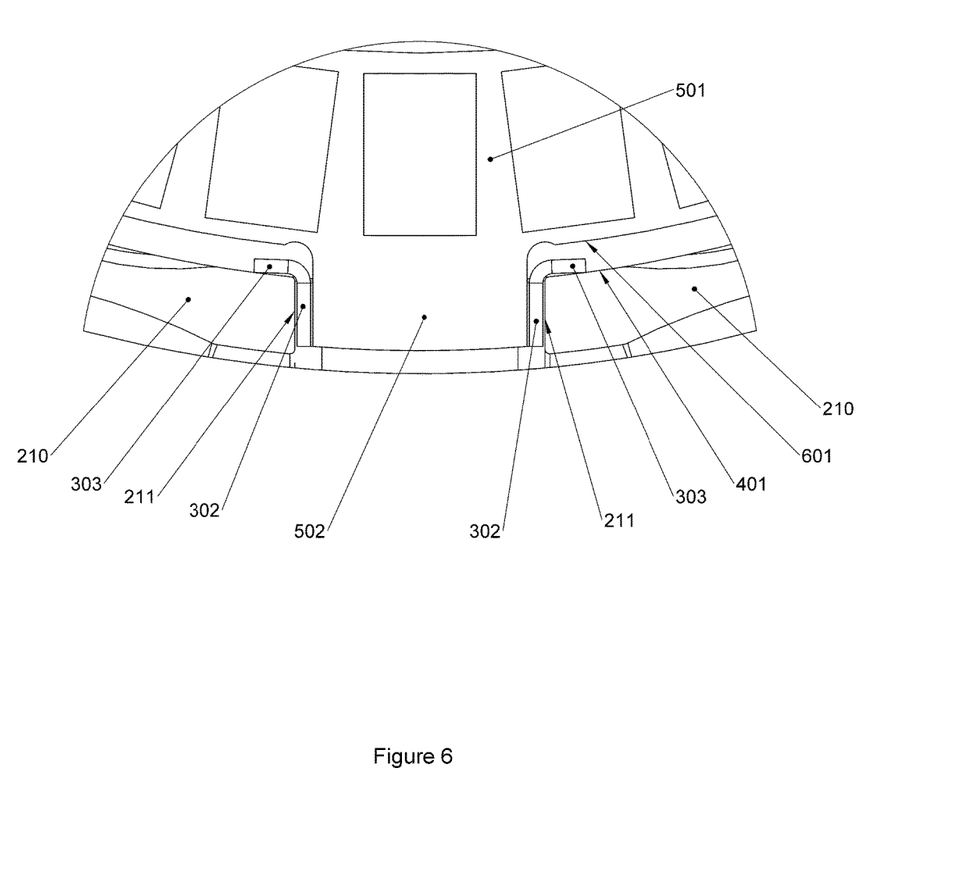
FIG. 6 shows a top detail view of the improved friction disk clutch basket engagement tab, engaged with the improved liner and installed into a typical prior art clutch basket.

FIG. 6 shows a top view of the improved clutch basket liner 301 installed between the clutch basket fingers 210, the driving friction plate tab 502 disposed between the legs 302 and the ID capture flanges 303 disposed between the inner diameter locating surface 401 of the clutch basket 110 and the major diameter 601 of the driving friction disk 501. In this view it can be seen that the clutch basket liner 301 would be restrained from inward movement by the ID capture flanges 303 coming into contact with the major diameter 601 of the driving friction disk 501.

The 2009 Honda CRF-450R uses a typical standard clutch basket. The width of the slot 212 formed between the fingers 210 is approximately 0.550". The standard driving friction plate tabs 203 are 0.540" wide leaving a clearance of 0.010". In one embodiment, the improved clutch basket liner 301 is formed from material have uniform thickness of 0.030". With the improved clutch basket liner 301 installed, the width of the slot with the liner installed is 0.490", the narrowed driving friction plate tabs 502 are 0.480" wide also leaving a clearance of 0.010".

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A clutch system, comprising:
    a clutch basket with a center axis of rotation, said clutch basket including at least two fingers;
    one or more liners to be installed in one or more slots formed by one or more spaces between said at least two fingers, each slot capable of accommodating a single liner, the single liner having two legs connected by a base, said base having a straight planar shape, said legs and said base forming a U-shape when said single liner is inserted into said slot and viewed in a first direction perpendicular to a clutch basket center axis of rotation;
    each of said legs further having a capture flange extending from an edge of said leg to form an L-shape when said single liner is viewed in a second direction parallel to said basket center axis of rotation, whereby, when said single liner is installed in said slot, said capture flange engages a radially inwardly facing surface of said clutch basket to restrain said liner within said basket when said basket is rotated and whereby said single liner does not engage a radially outwardly facing surface of said clutch basket;
    said single liner further configured such that, when said single liner is in a free state and is not inserted into said slot, said legs extend from said base at an angle greater than 90 degrees; and
    one or more friction disks having an inner diameter and outer diameter of standard dimensions for use with said clutch basket and incorporating one or more narrowed tabs, said narrowed tabs having a width of predetermined size such that said one or more narrowed tabs are configured to fit within one or more spaces provided by said one or more liners when installed in said one or more slots.

2. The clutch system of claim 1 wherein said capture flange of each of said legs of said single liner extends from said edge of said leg at an obtuse angle.

3. A clutch system including a clutch basket having one or more slots the improvement comprising:
    one or more liners configured to engage said one or more slots, each of said one or more liners having two legs connected by a base, said base having a straight planar shape, said legs and said base forming a U-shape when said liner is located in one of said one or more slots and viewed in a first direction perpendicular to a basket center axis of rotation, each of said legs having a capture flange extending from an edge of said leg to form said leg as an L-shape when said liner is viewed in a second direction parallel to said basket center axis of rotation, wherein when said liners is in a free state and is not inserted into one of said one or more slots, said legs extend from said base at an angle greater than 90 degrees, whereby said capture flange engages a radially inwardly facing surface of said clutch basket to restrain said liner within said basket when said basket is rotated and whereby said liner does not engage a radially outwardly facing surface of said basket; and a friction disk having an inner diameter and outer diameter of standard dimensions for use with said clutch basket and incorporating one or more narrowed tabs, said one or more narrowed tabs having a width of predetermined size whereby said one or more narrowed tabs are configured to fit within one or more spaces provided by said one or more liners.

4. The clutch system of claim 3 wherein said liner is configured such that the end of each of said legs opposite said base contains an aperture capable of being engaged to facilitate installation and removal of said liners from said slots.

\* \* \* \* \*